United States Patent
Lee et al.

(10) Patent No.: US 12,034,187 B2
(45) Date of Patent: Jul. 9, 2024

(54) CARBON SUBSTRATE COMPRISING CARBON FIBERS UNIDIRECTIONALLY ALIGNED, AND GAS DIFFUSION LAYER EMPLOYING SAME

(71) Applicant: JNTG Co., Ltd., Hwaseong-si (KR)

(72) Inventors: Eun Sook Lee, Suwon-si (KR); Jy Young Jyoung, Suwon-si (KR); Na Hee Kang, Osan-si (KR); Do Hun Kim, Osan-si (KR); Tae Hyung Kim, Hwaseong-si (KR); Eun Chong Kim, Osan-si (KR); Tae Nyun Kim, Hwaseong-si (KR)

(73) Assignee: JNTG CO., LTD., Gyeonggi-do (KR)

( * ) Notice: Subject to any disclaimer, the term of this patent is extended or adjusted under 35 U.S.C. 154(b) by 509 days.

(21) Appl. No.: 17/311,625

(22) PCT Filed: Dec. 2, 2019

(86) PCT No.: PCT/KR2019/016843
§ 371 (c)(1),
(2) Date: Jun. 7, 2021

(87) PCT Pub. No.: WO2020/116877
PCT Pub. Date: Jun. 11, 2020

(65) Prior Publication Data
US 2022/0021007 A1  Jan. 20, 2022

(30) Foreign Application Priority Data
Dec. 5, 2018  (KR) .................. 10-2018-0154835

(51) Int. Cl.
*H01M 4/00*  (2006.01)
*H01M 4/86*  (2006.01)
(Continued)

(52) U.S. Cl.
CPC ......... *H01M 8/0234* (2013.01); *H01M 4/861* (2013.01); *H01M 4/8647* (2013.01); *H01M 8/0245* (2013.01); *H01M 8/1004* (2013.01)

(58) Field of Classification Search
CPC .. H01M 4/8647; H01M 8/0234; H01M 4/861; H01M 8/0245; H01M 8/0241; H01M 8/1004; Y02E 60/50
See application file for complete search history.

(56) References Cited

U.S. PATENT DOCUMENTS

| | | |
|---|---|---|
| 2014/0329163 A1 | 11/2014 | Zhang et al. |
| 2017/0244107 A1 | 8/2017 | Utsunomiya |
| 2017/0301923 A1 | 10/2017 | Lee |

FOREIGN PATENT DOCUMENTS

| | | | |
|---|---|---|---|
| EP | 2930259 B1 | | 8/2018 |
| JP | 2004311276 A | * | 11/2004 |

(Continued)

OTHER PUBLICATIONS

Okano et al, Electroconductive Porous Substrate for Gas-Diffusion Electrode, Comprises Carbon Fibers, and Has, in Specific In-plane Direction and Thickness Direction of Substrate, Preset Ratio of Number of Carbon Fibers Oriented in Specific Directions, Sep. 2017, See the Abstract. (Year: 2017).*

(Continued)

*Primary Examiner* — Cynthia H Kelly
*Assistant Examiner* — Monique M Wills
(74) *Attorney, Agent, or Firm* — FARBER LLC; Jonathan Winter

(57) ABSTRACT

Disclosed are a carbon substrate for a gas diffusion layer of a fuel cell, a gas diffusion layer employing the same, an electrode for a fuel cell, a membrane electrode assembly for a fuel cell, and a fuel cell, wherein the carbon substrate includes a plate-shaped substrate having an upper surface and a lower surface opposite the upper surface, and the plate-shaped substrate includes carbon fibers arranged to extend in one direction (extend unidirectionally) and a carbide of an organic polymer located between the carbon fibers to bind the carbon fibers to each other. Since the carbon substrate according to the present disclosure includes carbon fibers aligned in at least one direction selected from a machine direction (MD) and a cross-machine direction (CMD) by controlling the alignment of carbon fibers, the carbon substrate has excellent mechanical strength, particularly, bending strength, even if its thickness is thin, and thus (Continued)

it is possible to effectively prevent the intrusion phenomenon of the gas diffusion layer into the flow path of the metal separator, and has excellent gas flow characteristics.

12 Claims, 9 Drawing Sheets

(51) Int. Cl.
  *H01M 8/0234* (2016.01)
  *H01M 8/0245* (2016.01)
  *H01M 8/1004* (2016.01)

(56) References Cited

FOREIGN PATENT DOCUMENTS

| | | | | | |
|---|---|---|---|---|---|
| JP | 2006222024 | A | | 8/2006 | |
| JP | 2011049179 | A | | 3/2011 | |
| JP | 2015005525 | A | | 1/2015 | |
| JP | 2015173134 | A | * | 10/2015 | |
| JP | 2015173134 | A | | 10/2015 | |
| JP | 2017171550 | A | * | 9/2017 | ............ H01M 4/00 |
| JP | 2018026343 | A | | 2/2018 | |
| JP | 2018144379 | A | | 9/2018 | |
| WO | WO-2014126002 | A1 | * | 8/2014 | ......... H01M 4/8807 |

OTHER PUBLICATIONS

Yamauchi et al, Polymer Membrane Electrode Jointed Body and Polyelectrolyte Fuel Cell, Nov. 2004, See the Abstract. (Year: 2004).*
Kishimoto et al, Gas Diffusion Layer for Fuel Battery, Manufacturing Method Therefor, Gas Diffusion Electrode for Fuel Battery Using the Same, Membrane-Electrode Junction for Fuel Battery, and Fuel Battery, Oct. 2015, See the Abstract. (Year: 2015).*
Okano et al, Fuel-Cell Gas Dispersion Layer, and Method for Producing Same, Aug. 2014, See the Abstract. (Year: 2018).*
Extended European Search Report for Application No. PCT/KR2019016843 dated Aug. 30, 2022.

* cited by examiner

CARBON SUBSTRATE COMPRISING CARBON FIBERS UNIDIRECTIONALLY ALIGNED, AND GAS DIFFUSION LAYER EMPLOYING SAME

FIELD OF THE INVENTION

The present disclosure relates to a carbon substrate for a gas diffusion layer of a fuel cell, a gas diffusion layer employing the same, an electrode for a fuel cell, a membrane electrode assembly for a fuel cell, and a fuel cell, and more particularly to a carbon substrate including carbon fibers aligned in at least one direction (aligned unidirectionally), a gas diffusion layer employing the same, an electrode for a fuel cell, a membrane electrode assembly for a fuel cell, and a fuel cell.

The present disclosure relates to results of a task (Task number R0006471) performed with the support of a regional new industry promotion project (Managing agency: Korea Institute for Advancement of Technology) of the Ministry of Trade, Industry and Energy.

BACKGROUND OF THE INVENTION

A polymer electrolyte membrane fuel cell (PEMFC) has a low operating temperature and high efficiency, has high current density and power density, has a short start-up time, and has a rapid response to load changes, as compared with other types of fuel cells. A polymer electrolyte membrane fuel cell includes a membrane electrode assembly (MEA), in which a catalyst is applied on each of a fuel electrode and air electrode of a polymer electrolyte membrane to be formed into a catalyst-coated membrane (CCM) and a gas diffusion layer is bonded onto the applied catalyst, and bipolar plates adhering to both sides of the membrane electrode assembly. Here, the gas diffusion layer (GDL) is produced by coating a carbon substrate made of a porous carbon material, such as carbon cloth, carbon nonwoven fabric, and carbon paper, with a microporous layer (MPL).

Currently, an important issue with hydrogen fuel cell vehicles is to achieve the development of parts and materials capable of reducing the volumes of existing parts, reducing the prices thereof, increasing the durability thereof, and realizing high performance thereof. In order to decrease the unit cost of a fuel cell vehicle (FCV) and increase energy density thereof, a metal separator used as a fuel cell bipolar plate has higher stacking pressure than that of a conventional graphite separator. Accordingly, the pressure applied to a membrane electrode assembly (MEA) and a gas diffusion layer (GDL) per unit area is greatly increased, and thus the gas diffusion layer may collapse, resulting in a decrease in the performance and durability of the fuel cell.

Currently, conversion of a bulky recreation vehicle (RV) into a passenger car or a light vehicle is being considered. For this purpose, it is necessary to reduce the volume of a fuel cell stack, and this is a time when reduction of the thickness of the metal separator and the thickness of the gas diffusion layer supporting the metal separator is desperately needed.

In a conventional metal separator, fuel and oxygen are transferred to the gas diffusion layer through channels of each metal separator. However, in a recent porous separator applied to the development of an air electrode, air distribution and turbulence occurs in the separator due to its three-dimensional structure and air is transferred to a gas diffusion layer. In the case of a conventional channeled separator, the gas diffusion layer and the separator are in contact with each other at surface areas, but the porous separator is in contact with the gas diffusion layer in dots or lines. When the porous separator is stacked, the pressure applied to the gas diffusion layer is much higher than that of the conventional channeled metal separator. Therefore, a gas diffusion layer for application to automobiles is required not only to have reduced thickness but also high rigidity.

In addition, a stack contracts or expands according to temperature changes or reaction conditions during fastening or operation of the stack. Thus, the pressure applied to each component in the stack changes, and the gasket and the gas diffusion layer serves as a spring that buffers the pressure. Most of the gas diffusion layers have characteristics of little recovery when pressed once by applying pressure. However, since it is unreasonable for the gasket to completely serve as a spring, it is hoped that the gas diffusion layer has structurally spring-like characteristics.

Since most of the carbon paper-type gas diffusion layers are made through a papermaking method using carbon fibers in a wet-laid nonwoven process, it is common to have an isotropic structure in which carbon fibers are randomly arranged. However, since the gas diffusion layer having an isotropic structure has the same structure in all sides, when a force is concentrated on the surface directly contacting the gas diffusion layer in the channeled separator structure, carbon fibers are broken and compressed, and an intrusion phenomenon in which the gas diffusion layer is inserted into the channels or flow field of the separator occurs, thereby reducing a space in which air or fuel can move. This intrusion phenomenon causes a pressure rise in the flow path of the separator, thereby increasing the power consumption of a pump. The structure collapse of the gas diffusion layer due to the broken carbon fibers at the interface between the gas diffusion layer and the flow path deteriorates the durability of the gas diffusion layer and the ability thereof for mass transfer such as gas flow.

SUMMARY OF THE INVENTION

Technical Problem

An object of the present disclosure is to provide a substrate for a gas diffusion layer of a fuel cell, the substrate having excellent mechanical strength.

Another object of the present disclosure is to provide a carbon substrate for a gas diffusion layer of a fuel cell, in which the intrusion of the gas diffusion layer into a flow path of a metal separator is improved.

Another object of the present disclosure is to provide a substrate for a gas diffusion layer of a fuel cell, the substrate having excellent gas flow characteristics.

Another object of the present disclosure is to provide a carbon substrate for a gas diffusion layer, the carbon substrate being capable of effectively discharging water generated from an air electrode to a porous separator.

Another object of the present disclosure is to provide a gas diffusion layer for a fuel cell, the gas diffusion layer including the carbon substrate.

Another object of the present disclosure is to provide a membrane electrode assembly having improved cell performance, the assembly including the gas diffusion layer for a fuel cell.

Another object of the present disclosure is to provide a fuel cell having improved cell performance, the fuel cell including the gas diffusion layer.

Solution to Problem

According to an aspect of the present disclosure, there is provided a carbon substrate for a gas diffusion layer of a fuel cell, the carbon substrate including a plate-shaped substrate having an upper surface and a lower surface opposite to the upper surface, wherein the plate-shaped substrate includes carbon fibers arranged to extend in one direction (extend unidirectionally) and a carbide of an organic polymer that is located between the carbon fibers to bind the carbon fibers to each other.

The one direction may be a machine direction (MD) or a cross-machine direction (CMD).

The carbon fibers may be in the form of carbon fiber filaments, an assembly of carbon fibers, or a tow of carbon fibers.

According to another aspect of the present disclosure, there is provided a carbon substrate for a gas diffusion layer of a fuel cell, the carbon substrate including a plate-shaped substrate having an upper surface and a lower surface opposite to the upper surface, wherein the plate-shaped substrate includes first carbon fibers extending in a first direction, second carbon fibers extending in a second direction, and a carbide of an organic polymer that binds the first and second carbon fibers to each other.

The first direction and the second direction may be at least one direction selected from a machine direction (MD) and a cross-machine direction (CMD), and are the same as or perpendicular to each other.

The first carbon fibers and the second carbon fibers may be woven in at least one weave selected from plain weave, twill weave, satin weave, and a combination thereof.

The first carbon fibers and the second carbon fibers may be in the form of at least one selected from carbon fiber filaments, an assembly of carbon fibers, and a tow of carbon fibers.

A length between intersection points at which the first carbon fibers and the second carbon fibers intersect each other may be 5 mm to 100 mm.

According to another aspect of the present disclosure, there is provided a carbon substrate for a gas diffusion layer of a fuel cell, the carbon substrate including a first plate-shaped substrate having an upper surface and a lower surface opposite the upper surface, and a second plate-shaped substrate laminated on the upper surface of the first plate-shaped substrate and having an upper surface and a lower surface opposite the upper surface, wherein the first plate-shaped substrate includes first carbon fibers arranged to extend in a first direction, and a carbide of an organic polymer that is provided between the first carbon fibers to bind the first carbon fibers to each other, and the second plate-shaped substrate includes second carbon fibers arranged to extend in a second direction, and a carbide of an organic polymer that is provided between the second carbon fibers to bind the second carbon fibers to each other.

The first direction and the second direction are at least one direction selected from a machine direction (MD) and a cross-machine direction (CMD), and may be the same as or perpendicular to each other.

The first carbon fibers and the second carbon fibers may be in the form of at least one selected from carbon fiber filaments, an assembly of carbon fibers, and a tow of carbon fibers.

The carbon substrate may further include: a third plate-shaped substrate laminated on an upper surface of the second plate-shaped substrate, wherein the third plate-shaped substrate may include third carbon fibers arranged irregularly, and a carbide of an organic polymer that is provided between the third carbon fibers to bind the third carbon fibers to each other.

According to another aspect of the present disclosure, there is provided a carbon substrate for a gas diffusion layer of a fuel cell, the carbon substrate including a first plate-shaped substrate having an upper surface and a lower surface opposite the upper surface, and a second plate-shaped substrate laminated on the upper surface of the first plate-shaped substrate and having an upper surface and a lower surface opposite the upper surface, wherein the first plate-shaped substrate includes first carbon fibers arranged to extend in one direction, and a carbide of an organic polymer that is provided between the first carbon fibers to bind the first carbon fibers to each other, and the second plate-shaped substrate includes second carbon fibers arranged irregularly, and a carbide of an organic polymer that is provided between the second carbon fibers to bind the second carbon fibers to each other.

The one direction may be a machine direction (MD) or a cross-machine direction (CMD).

The first carbon fibers and the second carbon fibers may be in the form of at least one selected from carbon fiber filaments, an assembly of carbon fibers, and a tow of carbon fibers.

According to another aspect of the present disclosure, there is provided a carbon substrate for a gas diffusion layer of a fuel cell, the carbon substrate including a first plate-shaped substrate having an upper surface and a lower surface opposite the upper surface, and a second plate-shaped substrate laminated on the upper surface of the first plate-shaped substrate and having an upper surface and a lower surface opposite the upper surface, wherein the first plate-shaped substrate includes first carbon fibers arranged to extend in a first direction, second carbon fibers arranged to extend in a second direction, and a carbide of an organic polymer that is provided between the first and second carbon fibers to bind the first and second carbon fibers to each other, and the second plate-shaped substrate includes third carbon fibers arranged irregularly, and a carbide of an organic polymer that is provided between the third carbon fibers to bind the third carbon fibers to each other.

The first direction and the second direction may be at least one direction selected from a machine direction (MD) and a cross-machine direction (CMD), and may be the same as or perpendicular to each other.

The first carbon fibers and the second carbon fibers are woven in at least one weave selected from plain weave, twill weave, satin weave, and a combination thereof.

The first carbon fibers and the second carbon fibers may be in the form of at least one selected from carbon fiber filaments, an assembly of carbon fibers, and a tow of carbon fibers.

According to another aspect of the present disclosure, there is provided a gas diffusion layer for a fuel cell, the gas diffusion layer including: the above-described carbon substrate; and a microporous layer formed on the carbon substrate.

According to another aspect of the present disclosure, there is provided an electrode for a fuel cell, the electrode including: the above-described carbon substrate or the above-described gas diffusion layer.

According to another aspect of the present disclosure, there is provided a membrane electrode assembly including: the above-described electrode.

According to another aspect of the present disclosure, there is provided a fuel cell including: the above-described membrane electrode assembly.

In the present disclosure, the assembly of carbon fibers refers to an assembly in which a plurality of carbon fiber filaments arranged and extended in one direction to form a two-dimensional band or sheet, and each of the filaments constituting the band or sheet are integrally bonded to each other by a carbide of an organic polymer. The use of such an assembly of carbon fibers has an advantage of obtaining high mechanical strength even when the carbon substrate is thin.

Advantageous Effects of Disclosure

Since the carbon substrate according to the present disclosure includes carbon fibers aligned in at least one direction selected from a machine direction (MD) and a cross-machine direction (CMD) by controlling the alignment of carbon fibers, the carbon substrate has excellent mechanical strength, particularly, bending strength even if its thickness is thin, so it is possible to effectively prevent the intrusion phenomenon of the gas diffusion layer into the flow path of the metal separator, that is, a phenomenon in which the gas diffusion layer is intruded or penetrated into the flow path of the metal separator, has excellent gas flow characteristics (transfer of hydrogen and oxygen from a porous separator to an electrode layer), and has a structure capable of effectively discharging water generated from an air electrode to the porous separator.

Particularly, since the carbon substrate according to the present disclosure includes both carbon fibers aligned in a machine direction (MD) and carbon fibers aligned in a cross-machine direction (CMD) by controlling the alignment of carbon fibers, the carbon substrate has excellent mechanical strength, particularly, bending strength in the, machine direction (MD and the cross-machine direction (CMD), so it is possible to effectively prevent the intrusion phenomenon of the gas diffusion layer into the flow path of the metal separator, that is, a phenomenon in which the gas diffusion layer is intruded or penetrated into the flow path of the metal separator, has excellent gas flow characteristics (transfer of hydrogen and oxygen from a porous separator to an electrode layer), and has a structure capable of effectively discharging water generated from an air electrode to the porous separator.

In addition, the carbon substrate according to the present disclosure has improved resistance to pressure, and thus its spring characteristics may be improved. In the gas diffusion layer employing the carbon substrate of the present disclosure, gas diffusion resistance is reduced throughout the layer, so that high reactive gas diffusion properties and water discharge capacity are improved, and thus water generated during operation is efficiently discharged, thereby effectively preventing the deterioration of battery performance due to water flooding.

Accordingly, the gas diffusion layer employing the carbon substrate according to the present disclosure, the electrode, the membrane electrode assembly, and the fuel cell can exhibit stable battery performance over a long period of time.

DETAILED DESCRIPTION OF THE INVENTION

Best Mode

Figure 1:
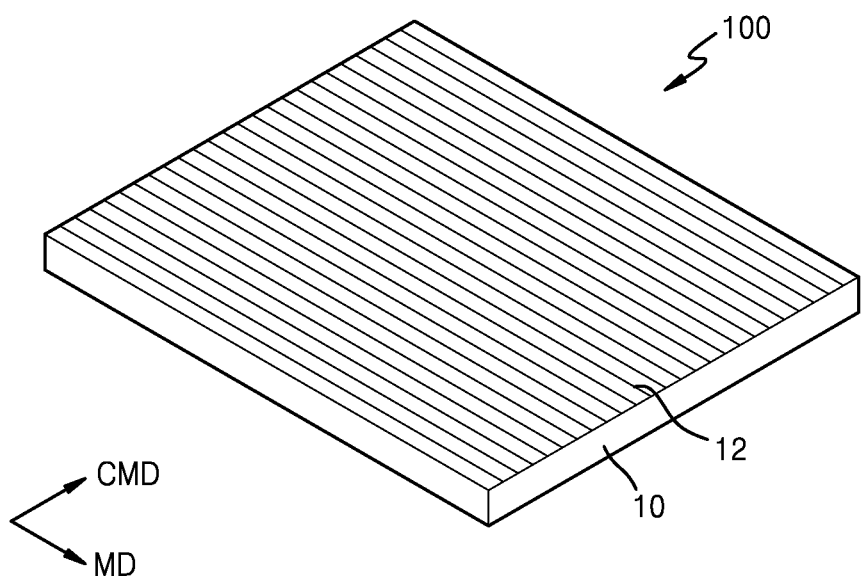
FIG. 1 is a schematic perspective view of a carbon substrate according to an embodiment of the present disclosure.

Hereinafter, a carbon substrate for a gas diffusion layer of a fuel cell according to various embodiments of the present disclosure, a method of manufacturing the same, an electrode including the same, a membrane electrode assembly, and a fuel cell will be described in detail. However, the following descriptions are only for illustrative purposes. Therefore, it is obvious to those skilled in the art that they may be variously modified and changed.

When manufacturing a carbon substrate for a gas diffusion layer by a conventional wet papermaking process, a method of passing a dispersion containing carbon fibers randomly suspended in a dispersion medium through a wire mesh is used. The dispersion may further include short binder fibers. The short binder fiber may be one or two or more selected from the group consisting of a short polyvinyl alcohol (PVA) fiber, a low melting point (LM) polyester short fiber, a polyethylene (PE) short fiber, a polypropylene (PP) short fiber, a cellulose short fiber, and a pitch short fiber. In this case, carbon fibers are randomly deposited on the wire mesh of the paper machine to form a two-dimensional carbon fiber pre-web. After the formation of the carbon fiber pre-web, the carbon fiber pre-web is impregnated with a slurry containing a carbon filler and a thermosetting resin such as an epoxy resin or a phenolic resin, and then dried to obtain an impregnated carbon fiber pre-web. In the pre-web obtained in this way, carbon fibers exhibit a disordered isotropic alignment state in which the carbon fibers are not preferentially aligned in any one direction. By applying heat and pressure to the impregnated carbon fiber pre-web, the thermosetting resin present in the short binder fibers or the like is cured and the carbon fiber pre-web is compressed. When the carbon fiber pre-web is heated in an inert atmosphere to carbonize the thermosetting resin and the binder fiber, a carbon fiber web may be obtained. If necessary, when the carbon fiber web is treated with a thermosetting resin suspension or emulsion, a carbon fiber web impregnated with the thermosetting resin may be obtained. Meanwhile, in the carbon substrate obtained in this way, the carbon fibers exhibit a disordered isotropic alignment state in which the carbon fibers are not preferentially aligned in any one direction. If the carbon fibers are arranged in such a disorder, there is a disadvantage in that the bonding between the fibers is weak and the mechanical strength thereof is lowered. For this reason, the bending strength of the carbon substrate is small, the tensile strength and rupture strength thereof are small, and a phenomenon that a gas diffusion layer intrudes into the flow path of a metal separator cannot be effectively prevented. Such low bending strength and mechanical strength in the machine direction (MD) and cross-machine direction (CMD) become a major factor in reducing durability in a flow pattern of a fuel cell. In the present disclosure, in order to solve this problem, a method of manufacturing a carbon substrate using carbon fibers arranged extending in at least one direction is used.

FIG. 1 is a schematic perspective view of a carbon substrate according to an embodiment of the present disclosure.

Referring to 1, a carbon substrate 100 includes a plate-shaped substrate 10 having an upper surface and a lower surface opposite to the upper surface. The plate-shaped substrate 10 includes carbon fibers 12 arranged to extend in one direction and a carbide (not shown) of an organic polymer that is located between the carbon fibers 12 to bind the carbon fibers 2 to each other. Although it is shown in FIG. 1 that the carbon fibers 12 are arranged to extend in the machine direction (MD), the present disclosure is not limited thereto. For example, the carbon fibers 12 may be arranged to extend in the cross-machine direction (CMD) perpendicular to the machine direction (MD) or, for example, may be arranged to extend in a direction inclined at an angle of 45 degrees with respect to the machine direction (MD). The carbon fibers 12 may be in the form of carbon fiber filaments, an assembly of carbon fibers, or a tow of carbon fibers. Specifically, the carbon fibers 12 may be a band-shape or sheet-shape assembly of carbon fibers molded with a predetermined width. The use of a plurality of carbon fiber filaments in the form of an integral assembly has an advantage of obtaining high mechanical strength even when the thickness of the carbon substrate is thin. The usable carbon fibers include carbon fiber filaments (filament thickness: 5 µm to 7 µm) or a tow form thereof prepared by carbonizing and/or graphitizing precursor fibers such as polyacrylonitrile (PAN), pitch, or rayon. Filaments or short fibers of carbon fibers sold under the registered trademark Tansome series by Hyosung Advanced Materials Corporation, carbon fibers sold under the registered trademark Torayca series by Toray Industries, carbon fibers sold under the trademark Panex™ PX series by Zoltek Corporation, carbon fibers sold under the registered trademark Sigrafil series by SGL Carbon SE, and carbon fibers sold under the trade name TC series by Formosa Plastics Corporation, or tow forms thereof may be exemplified. In the case of the tow form, it may be a tow form of 3,000 to 60,000 short carbon fibers or filaments.

The carbon substrate for a gas diffusion layer of a fuel cell according to another embodiment of the present disclosure is a plate-shaped substrate having an upper surface and a lower surface opposite to the upper surface. The plate-shaped substrate includes first carbon fibers extending in a first direction, second carbon fibers extending in a second direction, and a carbide of an organic polymer that binds the first and second carbon fibers to each other. In this embodiment and other embodiments described below, a filler such as carbon black may be further included in addition to the carbide. The first direction and the second direction may be at least one direction selected from the machine direction MD and the cross-machine direction CMD, and may be the same as or perpendicular to each other.

The thickness of the carbon substrate 100 is not particularly limited, but may be 20 µm to 1000 µm, for example, 20 µm to 500 µm, 30 µm to 400 µm, 30 µm to 300 µm, or 30 µm to 200 µm.

Although it is shown In FIGS. 2 to 8 below that unit carbon substrates are separated from each other to explain a laminated structure, really, these unit carbon substrates are laminated to form an integrated structure by contacting and fusing surfaces with each other because a carbide of an organic polymer serve as a binder. Although it is shown In FIGS. 2 to 8 below that there is a relatively large gap between the carbon fibers, this is for convenience of illustration, and is not actually perceived by the naked eye as if there is a gap between the carbon fibers.

Figure 2:
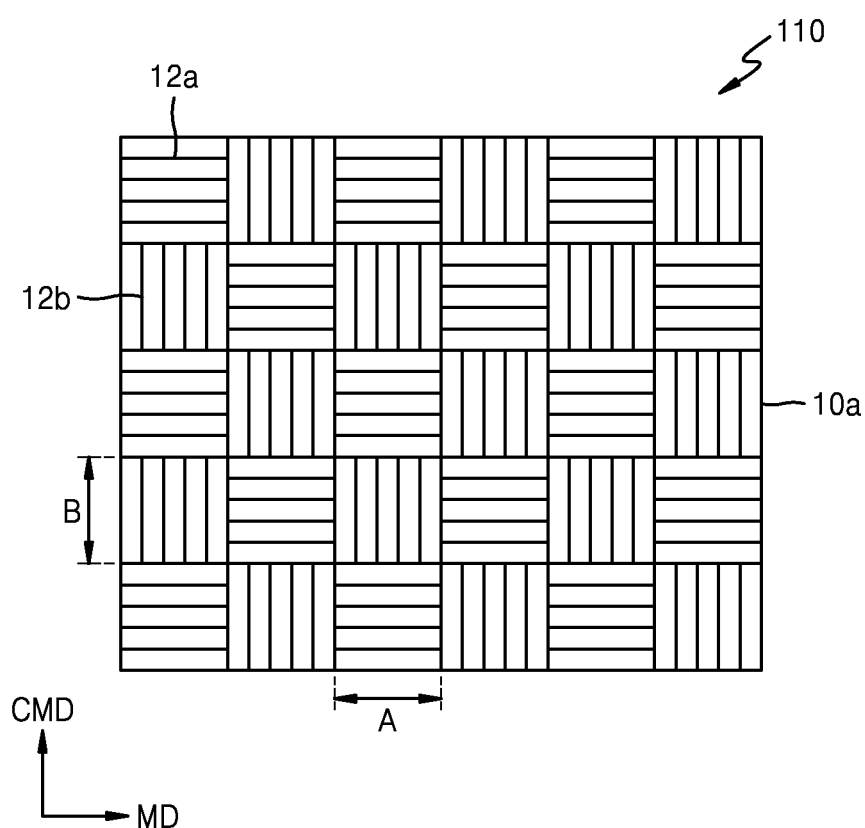
FIG. 2 is a plan view schematically showing an upper surface of a carbon substrate according to another embodiment of the present disclosure.

FIG. 2 is a plan view schematically showing an upper surface of the carbon substrate according to another embodiment of the present disclosure. That is, FIG. 2 shows a view from above of a carbon substrate 110 such as the carbon substrate 100 shown in FIG. 1 shown in a perspective view. Referring to FIG. 2, the carbon substrate 110 includes first carbon fibers 12a arranged to extend in the machine direction (MD), second carbon fibers 12b arranged to extend in the cross-machine direction (CMD), and a carbide of an organic polymer (not shown) that is provided between the first and second carbon fibers 12a and 12b to bind the first and second carbon fibers 12a and 12b to each other. The first and second carbon fibers 12a and 12b may be woven in at least one weave selected from plain weave, twill weave, satin weave, and combinations thereof. In the present embodiment, in the above-described structure, as in a conventional fabric, one machine direction (MD) yarn and one cross-machine direction (CMD) yarn may cross each other to form a weave. However, as shown in FIG. 2, the first carbon fibers 12a and the second carbon fibers 12b may be a band-shaped or sheet-shaped assembly of carbon fibers formed to have a predetermined width. The use of a plurality of carbon fiber filaments in the form of an integral assembly has an advantage of obtaining high mechanical strength even when the thickness of the carbon substrate is thin.

FIG. 2 shows a state in which the first and second carbon fibers 12a and 12b are woven in the form of a plain weave. The plain weave has a large shrinkage rate because the number of intersecting points of the first and second carbon fibers 12a and 12b is larger than that of the twill weave or the satin weave, but may be preferable in terms of increasing strength due to a strong structure. The first and second carbon fibers 12a and 12b may be in the form of at least one selected from a carbon fiber filament, an assembly of carbon fibers, and a tow of carbon fibers.

In the first direction and/or in the second direction, the length between the intersection points (A or B in FIG. 2) at which the first and second carbon fibers 12a and 12b intersect each other is 5 mm to 100 mm, for example, 10 mm to 50 mm, 15 mm to 45 mm, or 20 mm to 40 mm.

The thickness of the carbon substrate 110 is not particularly limited, but may be 20 μm to 1000 μm, for example, 20 μm to 500 μm, 30 μm to 400 μm, 30 μm to 300 μm, or 30 μm to 200 μm.

Figure 3:
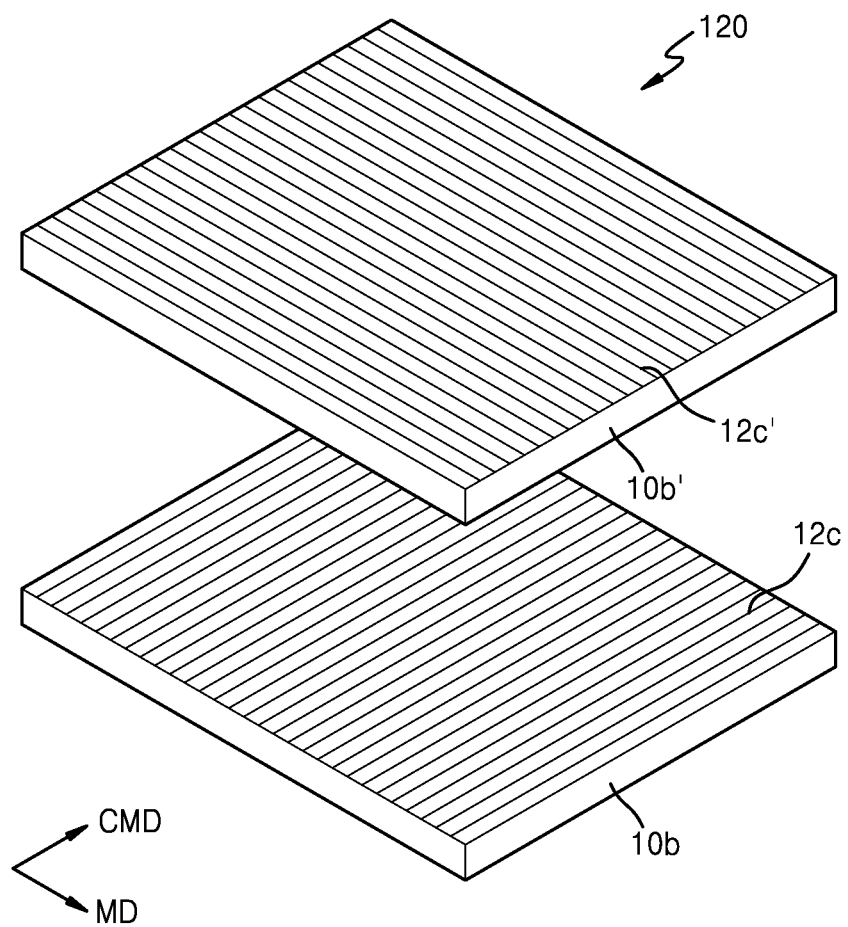
FIG. 3 is a schematic exploded perspective view showing a laminated structure of a carbon substrate according to another embodiment of the present disclosure.

FIG. 3 is a schematic exploded perspective view showing a laminated structure of a carbon substrate according to another embodiment of the present disclosure.

Referring to FIG. 3, a carbon substrate 120 includes a first plate-shaped substrate 10b having an upper surface and a lower surface opposite the upper surface, and a second plate-shaped substrate 10b' laminated on the upper surface of the first plate-shaped substrate 10b and having an upper surface and a lower surface opposite the upper surface. The first plate-shaped substrate 10b includes first carbon fibers 12c arranged to extend in a first direction, and a carbide of an organic polymer (not shown) that is provided between the first carbon fibers 12c to bind the first carbon fibers 12c to each other. The second plate-shaped substrate 10b' includes second carbon fibers 12c' arranged to extend in a second direction, and a carbide of an organic polymer (not shown) that is provided between the second carbon fibers 12c' to bind the second carbon fibers 12c' to each other. The first direction and the second direction may be at least one direction selected from a machine direction (MD) and a cross-machine direction (CMD), and may be the same as or perpendicular to each other. Although it is shown in FIG. 3 that the first carbon fibers 12c are arranged to extend in the cross-machine direction (CMD) and the second carbon fibers 12c' are arranged to extend in the machine direction (MD), the present disclosure is not limited thereto. For example, the first carbon fibers 12c may be arranged to extend in the machine direction (MD), and the second carbon fibers 12c' may be arranged to extend in the cross-machine direction (CMD).

Figure 4:
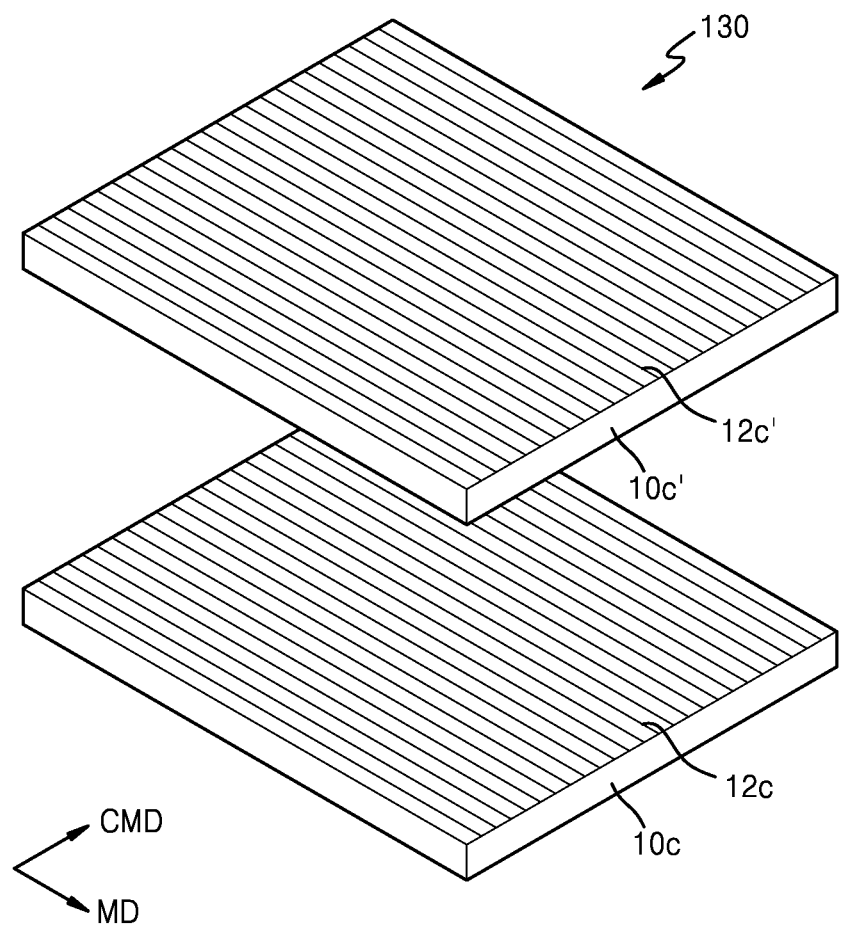
FIG. 4 is a schematic exploded perspective view showing a laminated structure of a carbon substrate according to another embodiment of the present disclosure.

Alternatively, the first carbon fibers 12c and the second carbon fibers 12c' may be arranged to extend in a direction inclined at 45 degree with respect to the machine direction MD. The first carbon fibers 12c and the second carbon fibers 12c' may be in the form of carbon fiber filaments, an assembly of carbon fibers, or a tow of carbon fibers. FIG. 4 shows a carbon substrate according to similar another alternative. That is, FIG. 4 is a schematic exploded perspective view showing a laminated structure of a carbon substrate according to another embodiment of the present disclosure. Referring to FIG. 4, a carbon substrate 130 includes a first plate-shaped substrate 10c having an upper surface and a lower surface opposite the upper surface, and a second plate-shaped substrate 10c' laminated on the upper surface of the first plate-shaped substrate 10c and having an upper surface and a lower surface opposite the upper surface. The first plate-shaped substrate 10c includes first carbon fibers 12c arranged to extend in the first direction, and a carbide of an organic polymer (not shown) that is provided between the first carbon fibers 12c to bind the first carbon fibers 12c to each other. The second plate-shaped substrate 10c' includes second carbon fibers 12c' arranged to extend in the second direction, and a carbide of an organic polymer (not shown) that is provided between the second carbon fibers 12c' to bind the second carbon fibers 12c' to each other. Although it is shown in FIG. 4 that both the first carbon fibers 12c and the second carbon fibers 12c' are arranged to extend in the machine direction (MD), both the first carbon fibers 12c and the second carbon fibers 12c' may be arranged to extend in the cross-machine direction (CMD).

In the carbon substrate 120 and the carbon substrate 130 shown in FIGS. 3 and 4, respectively, each of the first carbon fibers 12c and the second carbon fibers 12c' may be the band-shaped or sheet-shaped assembly of carbon fibers formed to have a predetermined width. The total thickness of the laminated structure of each of the carbon substrate 120 and the carbon substrate 130 shown in FIGS. 3 and 4, respectively, is not particularly limited, but may be 20 μm to 1000 μm, for example, 20 μm to 500 μm, 30 μm to 400 μm, 30 μm to 300 μm, or 30 μm to 200 μm.

Figure 5:
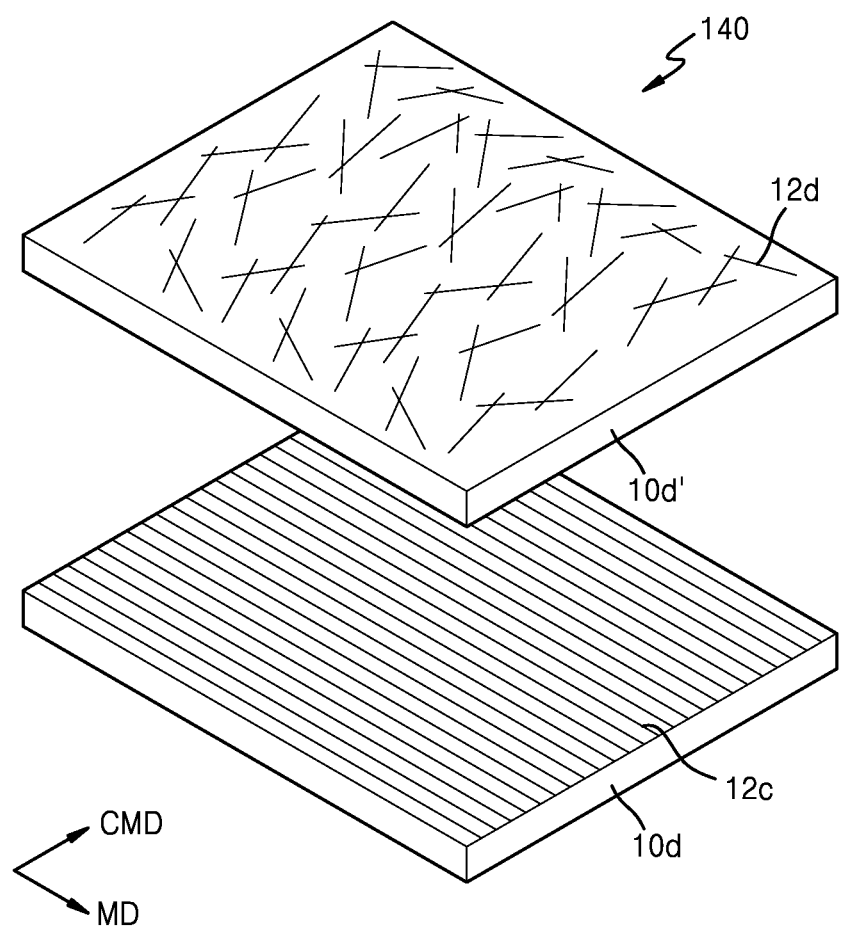
FIG. 5 is a schematic exploded perspective view showing a laminated structure of a carbon substrate according to another embodiment of the present disclosure.

FIG. 5 is a schematic exploded perspective view showing a laminated structure of a carbon substrate 140 according to another embodiment of the present disclosure.

Referring to FIG. 5, a carbon substrate 140 includes a first plate-shaped substrate 10d having an upper surface and a lower surface opposite the upper surface, and a second plate-shaped substrate 10d' laminated on the upper surface of the first plate-shaped substrate 10d and having an upper surface and a lower surface opposite the upper surface. The first plate-shaped substrate 10d includes first carbon fibers 12c arranged to extend in one direction, and a carbide of an organic polymer (not shown) that is provided between the first carbon fibers 12c to bind the first carbon fibers 12c to each other. The second plate-shaped substrate 10d' has an isotropic structure in which the second carbon fibers 12d are arranged irregularly, and includes a carbide of an organic polymer (not shown) that is provided between the second carbon fibers 12d to bind the second carbon fibers 12d to each other. Although it is shown in FIG. 4 that all the first carbon fibers 12c are arranged to extend in the machine direction (MD), the first carbon fibers 12c may be arranged to extend in the cross-machine direction (CMD). The first carbon fibers 12c may have at least one form selected from carbon fiber filaments, an assembly of carbon fibers, and a tow of carbon fibers. Specifically, the first carbon fibers 12c may be the band-shaped or sheet-shaped assembly of carbon fibers formed to have a predetermined width. The second carbon fibers 12d may be in the form of short carbon fibers or a tow of carbon fibers.

The total thickness of the carbon substrate 140 is not particularly limited, but may be 30 μm to 1000 μm, for example, 50 μm to 300 μm, or 50 μm to 200 μm. In the carbon substrate 140, the thickness of the first plate-shaped substrate 10d may be 20 μm to 500 μm, for example, 20 μm to 400 μm, 20 μm to 300 μm, or 20 μm to 200 μm. The thickness of the second plate-shaped substrate 10d' may be 20 μm to 300 μm, for example, 20 μm to 250 μm, 20 μm to 200 μm, or 20 μm to 100 μm.

Figure 6:
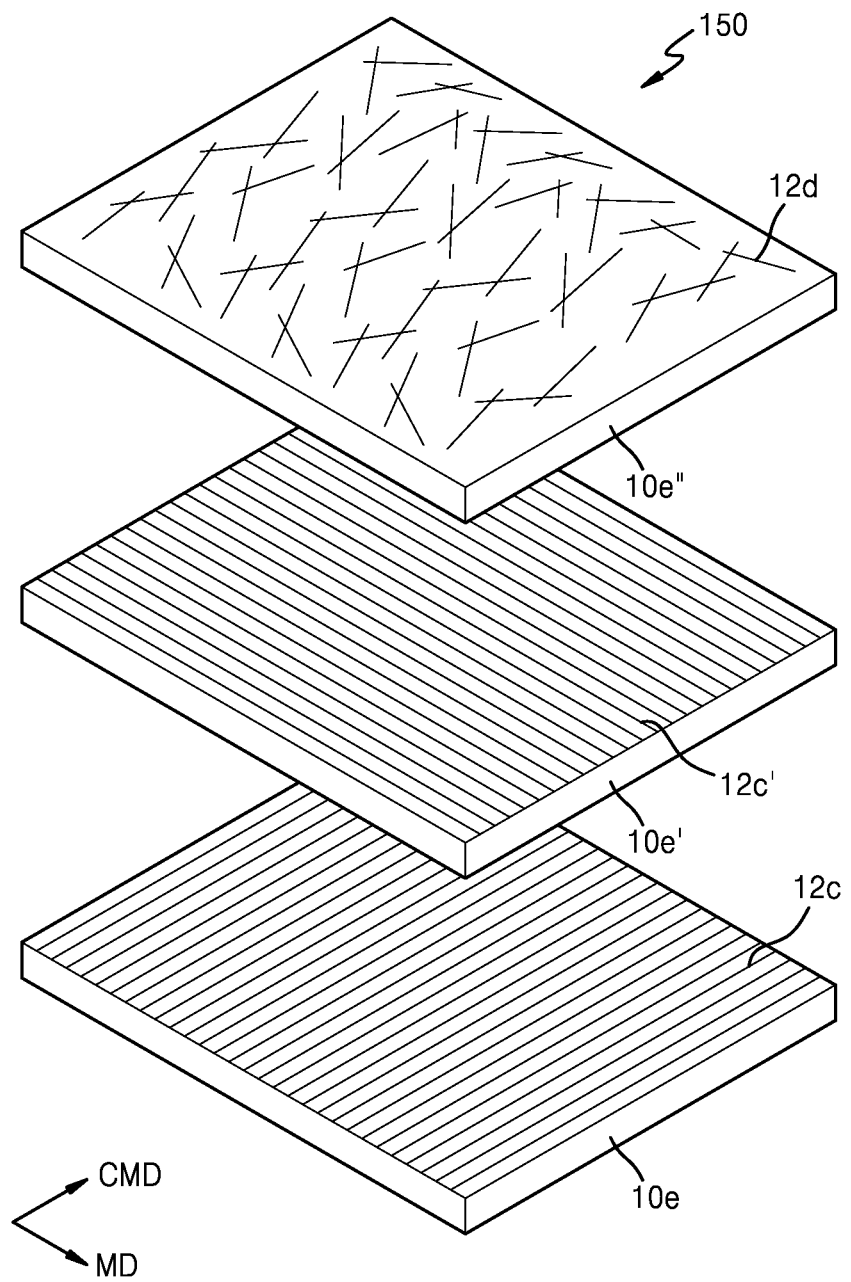
FIG. 6 is a schematic exploded perspective view showing a laminated structure of a carbon substrate according to another embodiment of the present disclosure.

FIG. 6 is a schematic exploded perspective view showing a laminated structure of a carbon substrate according to another embodiment of the present disclosure.

Referring to FIG. 6, a carbon substrate 150 includes a first plate-shaped substrate 10e having an upper surface and a lower surface opposite the upper surface, a second plate-shaped substrate 10e' laminated on the upper surface of the first plate-shaped substrate 10e and having an upper surface and a lower surface opposite the upper surface, and a third plate-shaped substrate 10e'' laminated on the upper surface of the second plate-shaped substrate 10e'. The first plate-shaped substrate 10e includes first carbon fibers 12c arranged to extend in the first direction, and a carbide of an organic polymer (not shown) that is provided between the first carbon fibers 12c to bind the first carbon fibers 12c to each other. The second plate-shaped substrate 10e' includes second carbon fibers 12c' arranged to extend in the second direction, and a carbide of an organic polymer (not shown) that is provided between the second carbon fibers 12c' to bind the second carbon fibers 12c' to each other. The third plate-shaped substrate 10e" has an isotropic structure in which the third carbon fibers 12d are arranged irregularly, and includes a carbide of an organic polymer (not shown) that is provided between the third carbon fibers 12d to bind the third carbon fibers 12d to each other. The first direction and the second direction may be at least one direction selected from the machine direction MD and the cross-machine direction CMD, and may be the same or perpendicular to each other. Although it is shown in FIG. 6 that the first carbon fibers 12c are arranged to extend in the cross-machine direction (CMD) and the second carbon fibers 12c' are arranged to extend in the machine direction (MD), the present disclosure is not limited thereto. For example, the first carbon fibers 12c may be arranged to extend in the machine direction (MD), and the second carbon fibers 12c' may be arranged to extend in the cross-machine direction (CMD).

Figure 7:
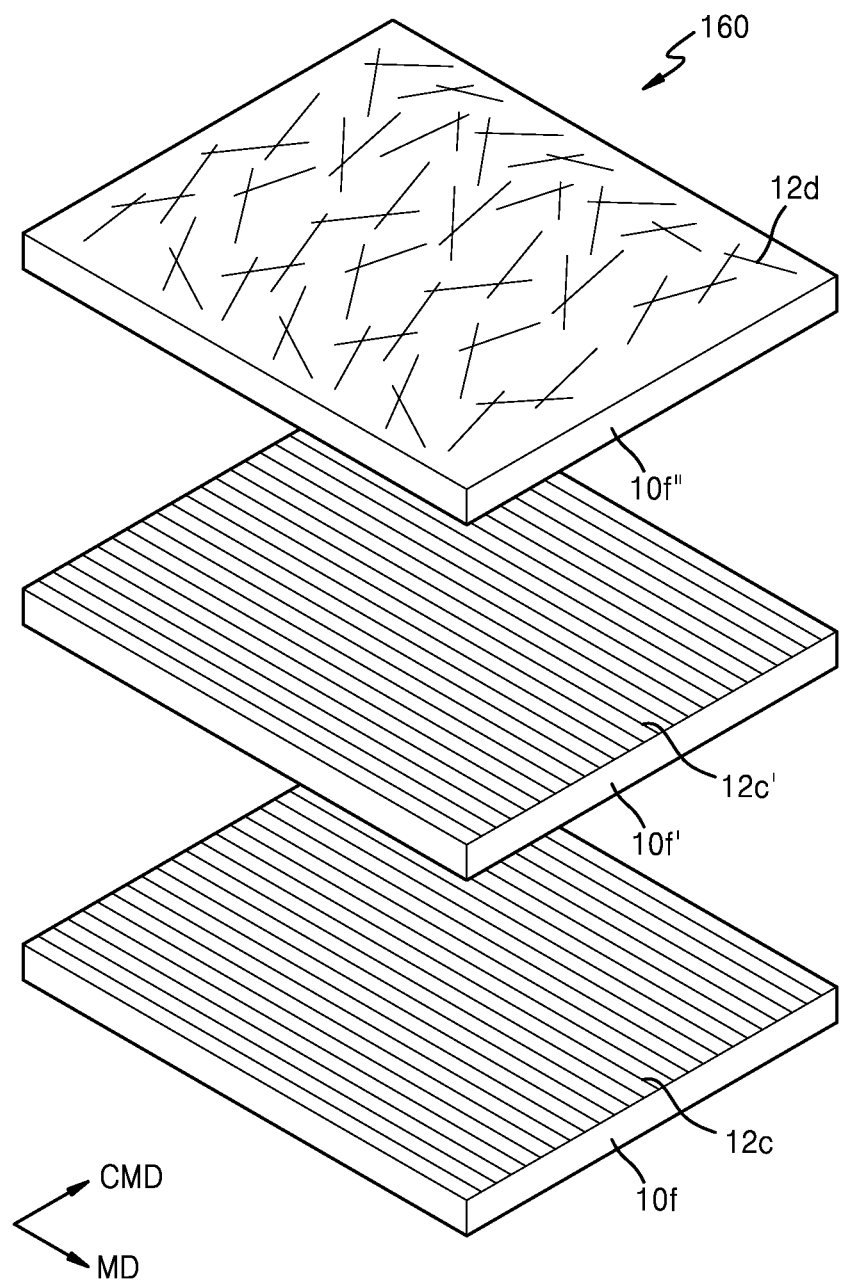
FIG. 7 is a schematic exploded perspective view showing a laminated structure of a carbon substrate according to another embodiment of the present disclosure.

FIG. 7 is a schematic exploded perspective view showing a laminated structure of a carbon substrate according to another embodiment of the present disclosure.

Referring to FIG. 7, a carbon substrate 160 includes a first plate-shaped substrate 10f having an upper surface and a lower surface opposite the upper surface, a second plate-shaped substrate 10f' laminated on the upper surface of the first plate-shaped substrate 10f and having an upper surface and a lower surface opposite the upper surface, and a third plate-shaped substrate 10f" laminated on the upper surface of the second plate-shaped substrate 10f. The first plate-shaped substrate 10f includes first carbon fibers 12c arranged to extend in the machine direction (MD), and a carbide of an organic polymer (not shown) that is provided between the first carbon fibers 12c to bind the first carbon fibers 12c to each other. The second plate-shaped substrate 10f' includes second carbon fibers 12c' arranged to extend in the machine direction (MD), and a carbide of an organic polymer (not shown) that is provided between the second carbon fibers 12c' to bind the second carbon fibers 12c' to each other. The third plate-shaped substrate 10f" has an isotropic structure in which the third carbon fibers 12d are arranged irregularly, and includes a carbide of an organic polymer (not shown) that is provided between the third carbon fibers 12d to bind the third carbon fibers 12d to each other.

In the carbon substrate 150 and the carbon substrate 160 shown in FIGS. 6 and 7, respectively, each of the first carbon fibers 12c and the second carbon fibers 12c' may be the band-shaped or sheet-shaped assembly of carbon fibers formed to have a predetermined width. The total thickness of the laminated structure of each of the carbon substrate 150 and the carbon substrate 160 shown in FIGS. 6 and 7, respectively, is not particularly limited, but may be 30 μm to 1000 μm, for example, 50 μm to 300 μm or 50 μm to 200 μm. Among them, the thickness of the first plate-shaped substrate 10e or the first plate-shaped substrate 10f may be 20 μm to 500 μm, for example, 20 μm to 400 μm, 20 μm to 300 μm, or 20 μm to 200 μm. The thickness of the third plate-shaped substrate 10e" or the third plate-shaped substrate 10f" may be 20 μm to 300 μm, for example, 20 μm to 250 μm, 20 μm to 200 μm, or 20 μm to 100 μm.

Figure 8:
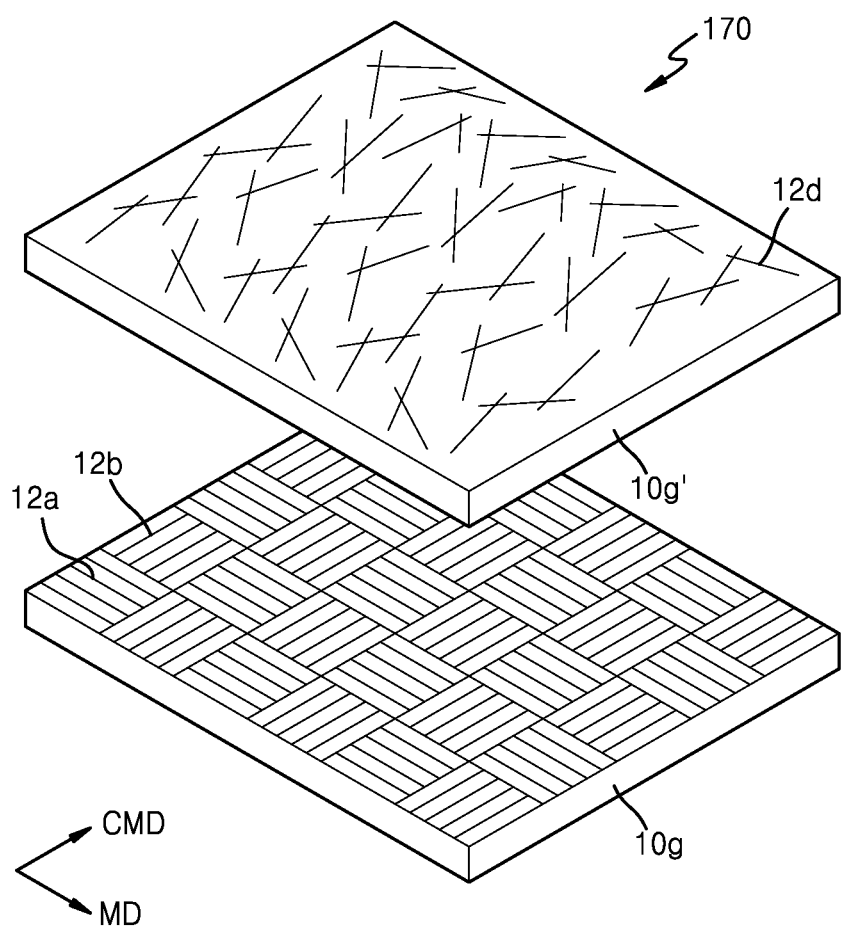
FIG. 8 is a schematic exploded perspective view showing a laminated structure of a carbon substrate according to another embodiment of the present disclosure.

FIG. 8 is a schematic exploded perspective view showing a laminated structure of a carbon substrate 170 according to another embodiment of the present disclosure.

Referring to FIG. 8, a carbon substrate 170 includes a first plate-shaped substrate 10g having an upper surface and a lower surface opposite the upper surface, and a second plate-shaped substrate 10g' laminated on the upper surface of the first plate-shaped substrate 10g and having an upper surface and a lower surface opposite the upper surface. The first plate-shaped substrate 10g includes first carbon fibers 12a arranged to extend in the first direction, second carbon fibers 12b arranged to extend in the second direction, and a carbide of an organic polymer (not shown) that is provided between the first and second carbon fibers 12a and 12b to bind the first and second carbon fibers 12a and 12b to each other. The second plate-shaped substrate 10g' has an isotropic structure in which the third carbon fibers 12d are arranged irregularly, and includes a carbide of an organic polymer (not shown) that is provided between the third carbon fibers 12d to bind the third carbon fibers 12d to each other. The first direction and the second direction may be at least one direction selected from the machine direction MD and the cross-machine direction CMD, and may be the same as or perpendicular to each other. The first and second carbon fibers 12a and 12b may be woven in at least one weave selected from plain weave, twill weave, satin weave, and combinations thereof. The first and second carbon fibers 12a and 12b may have at least one form selected from carbon fiber filaments, an assembly of carbon fibers, and a tow of carbon fibers. Specifically, as shown in FIG. 8, each of the first carbon fibers 12a and the second carbon fibers 12b may be the band-shaped or sheet-shaped assembly of carbon fibers formed to have a predetermined width. The use of a plurality of carbon fiber filaments in the form of an integral assembly has an advantage of obtaining high mechanical strength even when the thickness of the carbon substrate is thin. The third carbon fibers 12d may be in the form of short carbon fiber fibers or a tow of carbon fibers.

The total thickness of the laminated structure of the carbon substrate 170 is not particularly limited, but may be 30 μm to 1000 μm, for example, 50 μm to 300 μm, or 50 μm to 200 μm. In the carbon substrate 170, the thickness of the first plate-shaped substrate 10g may be 20 μm to 500 μm, for example, 20 μm to 400 μm, 20 μm to 300 μm, or 20 μm to 200 μm. The thickness of the second plate-shaped substrate 10g' may be 20 μm to 300 μm, for example, 20 μm to 250 μm, 20 μm to 200 μm, or 20 μm to 100 μm.

If necessary, each of the carbon substrates shown in FIGS. 1 to 8 may have a structure in which the plate-shaped substrates shown in these drawings are laminated repeatedly n times (n is an integer of 2 or more) to obtain a desired thickness. These embodiments may be combinable with each other. The respective unit carbon substrates of the carbon substrates shown in FIGS. 1 to 8 may have the same weight and thickness, or may have different weights and thicknesses.

Next, a method of manufacturing a carbon substrate for a gas diffusion layer of the present disclosure will be described in detail. For convenience of explanation, a laminated carbon substrate of the type shown in FIGS. 5 and 8 in which characteristics of the present disclosure are well shown will be described as an example.

(1) Preparation of a Unidirectional Carbon Fiber Array Prepreg and Fabric Thereof A conventional sheet-shaped two-dimensional array in which a plurality of carbon fiber filaments are arranged to be extended in one direction in parallel is impregnated with any resin such as an epoxy resin, a polyester resin, a polyimide resin, or a phenolic resin. For this resin impregnation, the array is covered with a release paper coated with an amount of resin to be impregnated on the array. Thereafter, when the array covered with the release paper is passed through a hot plate or a hot roller, the resin is melted and impregnated into the unidirectional carbon fiber array. When the carbon fiber array is impregnated with the resin, the release paper is removed, and the carbon fiber array is covered with a new release paper, and then passed through a cooling plate or cooling roller to be cooled to obtain a unidirectional carbon fiber array prepreg.

The sheet-shaped unidirectional carbon fiber array prepreg obtained in this way is cut to have a predetermined width. The cutting width of the unidirectional carbon fiber array prepreg for weaving is not particularly limited. For example, the cutting width thereof may be 5 mm to 50 mm, for example 5 mm to 40 mm, 5 mm to 30 mm, or 5 mm to 20 mm. The unidirectional carbon fiber array prepregs cut in the shape of a long thin band in this way are arranged at intersections in a warp direction and a weft direction, respectively, and are woven into a plain weave, twill weave, or satin weave type structure. Thereby, a fabric structure formed of unidirectional carbon fiber array prepregs may be obtained.

(2) Preparation of an Irregular Non-Woven Carbon Fiber Structure

When the above-described conventional papermaking method by wet dispersion is used, for example, it is possible to obtain a carbon fiber structure having an isotropic structure in which the second carbon fibers $12d$ capable of being used in the second plate-shaped substrate $10d'$ shown in FIG. 5 are randomly arranged. Specifically, the preparation of an irregular nonwoven fabric using carbon fibers may be performed using a wet-laid process. That is, a single type or two or more types of carbon fibers of different lengths are mixed in a state in which the carbon fibers are fully dispersed in a dispersion medium in an opening machine, and are supplied to a papermaking machine to be laminated on a wire mesh (belt) of the papermaking machine. In this case, the areal weight and thickness of the carbon fibers may be controlled by the supply amount and papermaking speed of the carbon fibers supplied to the papermaking machine. The structure of the irregular carbon fiber non-woven fabric may be a structure in which a contact surface contacting the mesh and a surface opposite to the contact surface are the same as each other, or may be a structure having a gradient of pores in the thickness direction.

(3) Attachment for Lamination

The unidirectional carbon fiber array prepreg obtained in step (1) or a fabric structure thereof; and the irregular non-woven carbon fiber structure obtained in step (2) are attached to prepare a laminated carbon fiber structure.

(4) Resin Impregnation

The carbon fiber structure obtained in step (3) is impregnated with a slurry including a thermosetting resin such as an epoxy resin or a phenol resin and carbon powder, and then dried and heat-treated to cure the thermosetting resin. The heat treatment temperature may be selected from a suitable temperature in the range of, for example, about 100° C. to 180° C.

(5) Carbonization and Graphitization

High-temperature heat treatment of the structure having undergone the thermal curing process is performed in an inert atmosphere to carbonize and/or graphitize the thermoplastic resin, thermosetting resin, and the like included in the above-described structure, thereby obtaining the carbon substrate according to the present disclosure. The carbide of the organic polymer formed in this way serves as a binder resin that binds constituent components.

(6) Application and Firing of Microporous Layer

Subsequently, a microporous layer is applied and fired on the above carbon substrate according to a conventional method to obtain a gas diffusion layer (GDL) The pore size of the microporous layer may be in a range of 0.1 μm to 20 μm, for example, 2 μm to 20 μm. The thickness of the microporous layer is not particularly limited, but may be 20 μm to 200 μm, for example, 20 μm to 100 μm, 20 μm to 80 μm, 20 μm to 60 μm, 20 μm to 50 μm, or 30 μm to 50 μm.

The electrode for a fuel cell of the present disclosure includes the substrate for a gas diffusion layer of the present disclosure, and may be used as a cathode or anode of a fuel cell.

The membrane electrode assembly for a fuel cell of the present disclosure includes the above-described electrode of the present disclosure.

The fuel cell of the present disclosure includes the above-described membrane electrode assembly of the present disclosure.

Hereinafter, the present disclosure will be described in more detail using the following examples, but the present disclosure is not limited to the following examples.

MODE OF DISCLOSURE

Example 1

Unidirectional carbon fiber array prepreg in which tows of carbon fiber filaments (manufacturer: Hyosung Advanced Materials Corporation, registered trademark: TANSOME: filament thickness: 5 to 7 μm, tensile strength: 3,500 to 5,100 MPa, carbon content: 93-95%) are arranged in the machine direction (MD) was prepared, and then an impregnation process, a curing process, and a carbonization process were performed to prepare a carbon substrate for a gas diffusion layer.

In this case, in the impregnation process, a slurry in which a phenolic resin solution (weight average molecular weight: about 3,000 to 5,000, solvent: N-methyl-2-pyrrolidone) and graphite particles (manufacturer: Asbury Carbons, model name: 5991) are dispersed (phenolic resin/graphite particle weight ratio=50/50, total solids content of the mixture: about 20 wt %) was impregnated in an amount of 3 mg/cm$^2$.

In the curing process, the prepreg was dried and cured using a heating belt temperature of about 120° C. and a three-stage roll in which the temperature was increased to about 100° C., about 150° C. and about 180° C., and then cooled to about 30° C. or lower using cooling air. In the carbonization process, carbonization treatment was carried out in a carbonization furnace at about 900° C. for 30 minutes while introducing nitrogen or argon at an injection rate of 10 l/min, and graphitization treatment was carried out in a graphitization furnace at about 2000° C. for 30 minutes while introducing nitrogen or argon at an injection rate of 10 l/min to obtain a carbon substrate having the characteristics as described in Example 1 of Table 1. In the impregnation process, the curing process, and the carbonization process, the speed of progress of the web was about 3 m/min.

Example 2

The unidirectional carbon fiber array prepreg obtained in Example 1 was cut into a band having a width of about 20 mm, and then used as weft and warp yarns to obtain a fabric substrate having a plain weave structure.

Thereafter, the impregnation process, the curing process, and the carbonization process, which had been described in Example 1, were performed to obtain a carbon substrate having the characteristics as described in Example 2 of Table 1.

Example 3

The unidirectional carbon fiber array prepreg in the MD direction obtained in Example 1 was prepared. A unidirectional carbon fiber array prepreg in which tows of carbon fiber filaments are arranged in the cross-machine direction (CMD) was prepared in the same manner as in Example 1. The unidirectional carbon fiber array prepreg plate-shaped substrate in the MD direction and the unidirectional carbon fiber array prepreg plate-shaped substrate in the CMD direction were laminated to each other, and then the impregnation process, the curing process, and the carbonization process, which had been described in Example 1, were performed to obtain a carbon substrate having the characteristics as described in Example 3 of Table 1.

Example 4

The unidirectional carbon fiber array prepreg in the MD direction, prepared in Example 1, and an irregular carbon fiber non-woven fabric substrate (an areal weight of 20 g/m2 and a thickness of about 120 μm), prepared in the manner described in Comparative Example below, were attached to each other to obtain a laminate.

Thereafter, the impregnation process, the curing process, and the carbonization process, which had been described in Example 1, were performed to obtain a carbon substrate having the characteristics as described in Example 4 of Table 1.

Example 5

A plain weave fabric substrate of the unidirectional carbon fiber array prepreg prepared in Example 2, and an irregular carbon fiber non-woven fabric substrate (an-areal weight of 20 g/m2 and a thickness of about 120 μm), prepared in the manner described in Comparative Example below, were attached to each other to obtain a laminate.

Thereafter, the impregnation process, the curing process, and the carbonization process, which had been described in Example 1, were performed to obtain a carbon substrate having the characteristics as described in Example 5 of Table 1.

Comparative Example

As raw materials, 90 wt % of carbon short fibers having a carbon content of 95%, a diameter of about 7 μm, a density of about 1.81 g/cc and an average length of about 6 mm or 12 mm, prepared using PAN as a precursor (here, the content ratio of 6 mm and 12 mm is 50/50); and 10 wt % of PVA short fibers as binder short fibers were prepared, and in a carbon pre-web formation process, a carbon fiber pre-web was prepared through mixing the short fibers, dispersing the short fibers in water and laminating them on the wire. The carbon fibers dispersed in water were supplied to a papermaking machine through a pump. In this case, a supply unit connected to a head box of the papermaking machine had a structure that gradually narrows toward the head box, and the carbon fibers in the carbon fiber dispersion were gradually aligned in parallel with a direction in which the dispersion flows. At this time, a wire and a slit of the supply unit had an adjustable structure at the portion where the dispersion first met the wire. When the gap of the slit is larger than the length of the carbon fibers, it is easy to have an isotropic structure, and when the gap thereof is small, it becomes an anisotropic structure. In this preparation example, before the dispersion meets the wire, the dispersion passed through a section capable of creating a vortex, and the slit gap was made larger than the length of the carbon fibers so that the second surface had an MD/TD arrangement ratio of 2.5. As the slit gap of the headbox gradually decreases, the carbon fibers are gradually arranged in the machine direction. In particular, as the feed rate of the dispersion increases and the gap decreases, and as the formation rate of a pre-web formed on the wire increases, the alignment of the carbon fibers in the machine direction further increases.

The dispersion medium contained in the carbon fibers laminated on the wire in the head box was dehydrated and dried through a dehydration process to prepare a pre-web.

The dried pre-web was subjected to a heat-pressing treatment process of a carbon fiber web performed at a temperature of 80 to 150° C. and a pressure of 1 to 10 kgf/cm², and wound to obtain a carbon fiber pre-web.

The carbon fiber pre-web obtained in this way was subjected to an impregnation process, a curing process, and a carbonization process to prepare a carbon substrate for a gas diffusion layer.

In this case, in the impregnation process, the carbon fiber pre-web was impregnated with a slurry in which a phenolic resin solution (weight average molecular weight: about 3,000 to 5,000, solvent: N-methyl-2-pyrrolidone) and graphite particles (manufacturer: Asbury Carbons, model name: 5991) were dispersed (phenolic resin/graphite particle weight ratio=50/50, total solids content of the mixture: about 20 wt %) in an amount of 3 mg/cm².

In the curing process, the web was dried and cured using a heating belt temperature of about 120° C. and a three-stage roll in which the temperature was increased to about 100° C., about 150° C. and about 180° C. At this time, the pressure was increased in a range of 1 to 10 kgf/cm². Thereafter, the web was cooled to about 30° C. or lower using cooling air. In the carbonization process, carbonization treatment was carried out in a carbonization furnace at about 900° C. for 30 minutes while introducing nitrogen or argon at an injection rate of 30 l/min, and graphitization treatment was carried out in a graphitization furnace at about 2000° C. for 30 minutes while introducing nitrogen or argon at an injection rate of 10 l/min to obtain a carbon substrate having the characteristics as described in Table 1.

Manufacturing of Gas Diffusion Layer

A microporous layer was formed on each of the carbon substrates obtained in Examples 1 to 5 and Comparative Example according to the following procedures.

1000 g of deionized water, 20 g of dispersant (Triton X-100), 75 g of carbon black (Vulcan XC-72), and 41.5 g of a 60 wt % PTFE (polytetrafluoroethylene) dispersion were added, followed by mechanical mixing to obtain a composition for a microporous layer. The composition was applied to each of the carbon substrates obtained in Examples and Comparative Example, dried at 120° C., and then heat-treated at about 350° C. for 30 minutes in an air atmosphere to obtain a gas diffusion layer. For this gas diffusion layer, the physical properties summarized in Table 1 below were evaluated.

TABLE 1

| | | | Example 1 | Example 2 | Example 3 | Example 4 | Example 5 | Comparative Example |
|---|---|---|---|---|---|---|---|---|
| Carbon substrate structure | | | Unidirectional carbon fiber plate-shaped substrate in MD direction (structure in FIG. 1) | Unidirectional carbon fiber plain weave plate-shaped substrate (structure in FIG. 2) | Laminate of unidirectional carbon fiber plate-shaped substrate in MD direction + unidirectional carbon fiber plate-shaped substrate in CMD direction. (structure in FIG. 3) | Laminate of unidirectional carbon fiber plate-shaped substrate in MD direction + irregular carbon fiber non-woven substrate (structure in FIG. 5) | Laminate of unidirectional carbon fiber plain weave plate-shaped substrate + irregular non-woven carbon fiber plate-shaped substrate (structure in FIG. 8) | Irregular non-woven substrate carbon fiber plate-shaped substrate |
| Amount of carbon fiber (g/m²) | | | 50 | 100 | 100 | 125 | 120 | 50 |
| Physical properties of carbon substrate | Areal weight | g/m² | 75 | 140 | 140 | 155 | 140 | 75 |
| | Thickness | μm | 70 ± 20 | 140 ± 20 | 120 ± 20 | 240 ± 20 | 330 ± 30 | 380 ± 20 |
| | Areal weight | g/m² | 120 | 190 | 190 | 190 | 180 | 115 |
| Physical properties of gas diffusion layer | Thickness | μm | 100 | 180 | 150 | 270 | 360 | 420 |
| | Resistance | mΩ · cm² | 20 | 25 | 25 | 15 | 17 | 15 |
| | Gas permeability | cc/cm2 · sec | — | — | — | 9.5 ± 1 | 3.5 ± 1 | 6.0 ± 2 |
| | Compression rate | % | 17 ± 2 | 19 ± 2 | 15 ± 2 | 12 ± 2 | 17 ± 2 | 20 ± 2 |
| | MD bending strength | g · cm | 65 | 50 | 50 | 130 | 60 | 40 |
| | CMD bending strength | g · cm | 3.5 ± 1 | 50 | 50 | ≤10 | 75 | 40 |
| | Intrusion amount | μm | 60 | 80 | 70 | 60 | 40 | 110 |
| | Current density @0.6 V | A/cm² | 1.06 | 1.15 | 1.06 | 1.40 | 1.34 | 1.22 |

Referring to the results in Table 1, it can be found that the bending strength of each of the carbon substrates of Examples 1 to 5 according to the disclosure in the machine direction (MD) and the cross-machine direction (CMD) was significantly increased, and the compression rate thereof was decreased, as compared with the carbon substrate of Comparative Example. From this, it can be found that durability is excellent because the intrusion amount of the gas diffusion layer formed using each of the carbon substrates of Examples 1 to 5 was significantly decreased. In particular, in the case of Examples 4 and 5 in which a unidirectional carbon fiber plate-shaped substrate and an isotropic irregular non-woven carbon fiber plate-shaped substrate were laminated, it was possible to obtain higher current density as well as better mechanical properties even at a much thinner thickness than those in the case Comparative Example.

The properties summarized in Table 1 above were evaluated according to the following procedures.

Evaluation Example 1: Areal Weight Measurement

Areal weight was calculated according to the ASTM D-646 standard. That is, sample was cut so that width and length were 225 mm, respectively, using a cutter. The width and length were measured using a measuring machine (Mitutoyo, 500-714). The sample cut to an area of 506.25 cm² was placed on a scale capable of measuring the weight of the sample up to 0.001 g, and the weight thereof was measured, divided by area, and converted using the following calculation equation.

Areal weight (unit: g/m²)=weight (g)/area (cm²)× 10,000²/1 m²

Evaluation Example 2: Thickness Measurement

Thickness measurement was performed using a measuring instrument (TMI, 49-56 digital micrometer thickness tester) having a pressure foot diameter of 16 mm (area: 2.00 cm²) and a measurement accuracy of 1 μm in accordance with ISO 534. Thicknesses of 10 or more locations were measured, and average value thereof was obtained.

Evaluation Example 3: Gas Permeability

Resulting values of gas permeability were obtained by permeating air in a direction from the carbon fiber substrate toward the microporous layer (MPL) using an air permeability analyzer (Textest Instuments, FX3300 Lab Air IV).

Evaluation Example 4: Measurement of Bending Strength

Bending strength of each of the carbon fiber substrate and the gas diffusion layer was measured using a Taber 150E tester (Taber, USA) in an environment having an indoor temperature of 20±5° C. and a relative humidity of 45±10 in accordance with ASTM D-5342.

Evaluation Example 5: Compression Rate

In order to measure the compression rate of the gas diffusion layer, the gas diffusion layer was cut to have a diameter of 24 mm, pressure was applied to the gas diffusion layer at a constant speed using a universal tester (UK Instron, UTM 5537) to measure the thickness displacement at 1 MPa, and the compression rate thereof was measured.

Evaluation Example 6: Measurement of Intrusion

In the measurement of intrusion, two gas diffusion layers were placed in a sample holder so that sides provided with the microporous layers faced each other, and the holder having a channel-lip shape pressed the gas diffusion layers while both sides of the gas diffusion layers facing each other in the same shape. Using a universal tester, the value of the gas diffusion layer intruding into the channel at 1 MPa was photographed with a microscope, and the value thereof was measured.

Evaluation Example 7: Unit Cell Evaluation

Each of the gas diffusion layers of Comparative Examples and Examples 1 to 5 was attached to an anode and cathode of a membrane PREMEA 5730 (Gore, USA) coated with a commercially available catalyst to manufacture a unit cell having an active area of 25 cm$^2$. In the performance evaluation of the unit cell, the performance was evaluated by measuring the potential change at a constant current while the relative humidity of the anode and the cathode were at RH100%, respectively, based on a battery temperature of 65° C.

Figure 9:
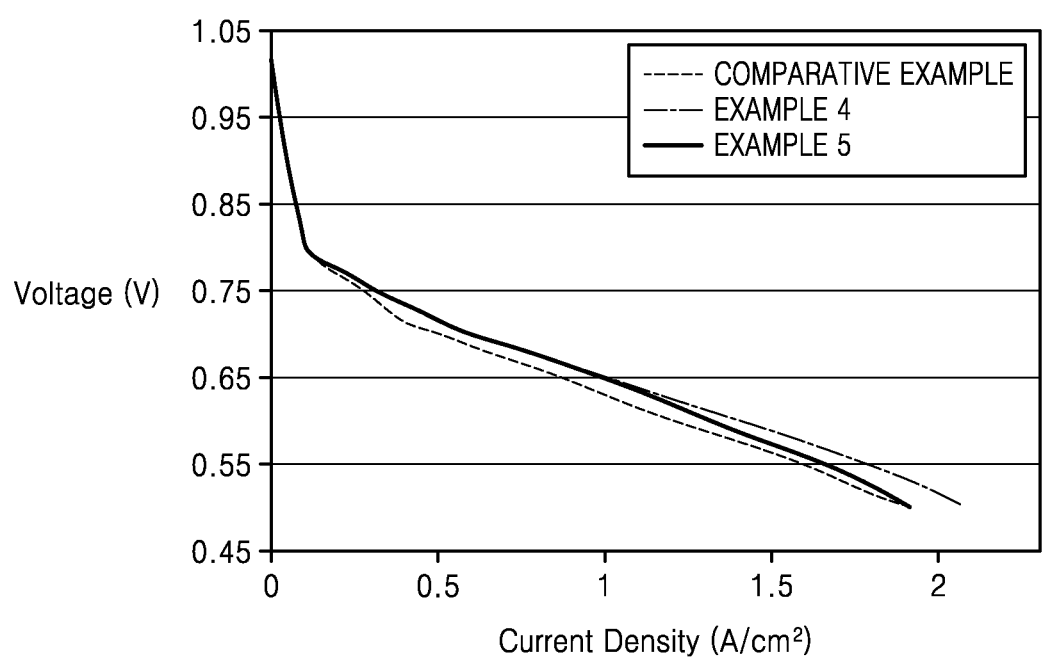
FIG. 9 shows current voltage (IV) curves of unit cells formed using carbon substrates of Examples 4 and 5 and Comparative Example.

FIG. 9 shows current voltage (IV) curves of unit cells formed using the carbon substrates of Examples 4 and 5 and Comparative Example.

The invention claimed is:

1. A carbon substrate for a gas diffusion layer of a fuel cell,
   the carbon substrate comprising: a first plate-shaped substrate having an upper surface and a lower surface opposite the upper surface; and a second plate-shaped substrate laminated on the upper surface of the first plate-shaped substrate and having an upper surface and a lower surface opposite the upper surface a third plate-shaped substrate laminated on an upper surface of the second plate-shaped substrate, wherein
   the first plate-shaped substrate includes first carbon fibers arranged to extend in a first direction, and a carbide of an organic polymer provided between the first carbon fibers to bind the first carbon fibers to each other, and
   the second plate-shaped substrate includes second carbon fibers arranged to extend in a second direction, and a carbide of an organic polymer provided between the second carbon fibers to bind the second carbon fibers to each other,
   wherein the first carbon fibers and the second carbon fibers are in the form of at least one selected from carbon fiber filaments, an assembly of carbon fibers, and a tow of carbon fibers;
   wherein the first direction and the second direction are at least one direction selected from a machine direction (MD) and a cross-machine direction (CMD), and are the same as or perpendicular to each other,
   wherein the third plate-shaped substrate includes third carbon fibers arranged irregularly, and a carbide of an organic polymer provided between the third carbon fibers to bind the third carbon fibers to each other.

2. A carbon substrate for a gas diffusion layer of a fuel cell,
   the carbon substrate comprising: a first plate-shaped substrate having an upper surface and a lower surface opposite the upper surface; and a second plate-shaped substrate laminated on the upper surface of the first plate-shaped substrate and having an upper surface and a lower surface opposite the upper surface, wherein
   the first plate-shaped substrate includes first carbon fibers arranged to extend in one direction, and a carbide of an organic polymer provided between the first carbon fibers to bind the first carbon fibers to each other, and
   the second plate-shaped substrate include second carbon fibers arranged irregularly, and a carbide of an organic polymer provided between the second carbon fibers to bind the second carbon fibers to each other,
   wherein the first carbon fibers and the second carbon fibers are in the form of at least one selected from carbon fiber filaments, an assembly of carbon fibers, and a tow of carbon fibers,
   wherein the one direction is a machine direction (MD) or a cross-machine direction (CMD).

3. A carbon substrate for a gas diffusion layer of a fuel cell,
   the carbon substrate comprising: a first plate-shaped substrate having an upper surface and a lower surface opposite the upper surface; and a second plate-shaped substrate laminated on the upper surface of the first plate-shaped substrate and having an upper surface and a lower surface opposite the upper surface, wherein
   the first plate-shaped substrate includes first carbon fibers arranged to extend in a first direction, second carbon fibers arranged to extend in a second direction, and a carbide of an organic polymer provided between the first and second carbon fibers to bind the first and second carbon fibers to each other, and
   the second plate-shaped substrate includes third carbon fibers arranged irregularly, and a carbide of an organic polymer provided between the third carbon fibers to bind the third carbon fibers to each other,
   wherein the first carbon fibers and the second carbon fibers are in the form of at least one selected from carbon fiber filaments, an assembly of carbon fibers, and a tow of carbon fibers,
   wherein the first direction and the second direction are at least one direction selected from a machine direction (MD) and a cross-machine direction (CMD), and are the same as or perpendicular to each other.

4. The carbon substrate of claim 3,
   wherein the first carbon fibers and the second carbon fibers are woven in at least one weave selected from plain weave, twill weave, satin weave, and a combination thereof.

5. A gas diffusion layer for a fuel cell, the gas diffusion layer comprising:
   the carbon substrate of claim 1; and
   a microporous layer formed on the carbon substrate.

6. An electrode for a fuel cell, the electrode comprising: the carbon substrate of claim 1 or the gas diffusion layer of claim 5.

7. A gas diffusion layer for a fuel cell, the gas diffusion layer comprising:
   the carbon substrate of claim 2; and
   a microporous layer formed on the carbon substrate.

8. An electrode for a fuel cell, the electrode comprising: the carbon substrate of claim 2.

9. A gas diffusion layer for a fuel cell, the gas diffusion layer comprising:
   the carbon substrate of claim 3; and
   a microporous layer formed on the carbon substrate.

10. An electrode for a fuel cell, the electrode comprising: the carbon substrate of claim 3.

11. An electrode for a fuel cell, the electrode comprising: the gas diffusion layer of claim 7.

12. An electrode for a fuel cell, the electrode comprising: the gas diffusion layer of claim 9.

* * * * *